United States Patent [19]

Imagawa et al.

[11] Patent Number: 5,214,840
[45] Date of Patent: Jun. 1, 1993

[54] THIN FILM MAGNETIC HEAD AND THE METHOD OF FABRICATING THE SAME

[75] Inventors: Takao Imagawa, Sendai; Masaaki Sano, Hitachi; Katsuya Mitsuoka, Hitachi; Kouichi Nishioka, Hitachi; Shinji Narishige, Mito; Tetsuo Kobayashi, Kanagawa, all of Japan

[73] Assignee: Hitachi, Ltd., Tokyo, Japan

[21] Appl. No.: 550,698

[22] Filed: Jul. 10, 1990

[30] Foreign Application Priority Data

Jul. 10, 1989 [JP] Japan .................................. 1-177825

[51] Int. Cl.⁵ .................................................. G11B 5/42
[52] U.S. Cl. ...................................... 29/603; 148/108; 427/130; 427/131
[58] Field of Search .................. 29/603; 427/130, 131, 427/132; 148/108

[56] References Cited

FOREIGN PATENT DOCUMENTS 5935431 8/1980 Japan .
63-809 1/1988 Japan .
64-88910 4/1989 Japan .

OTHER PUBLICATIONS

IEEE Transactions on Mag.; vol. Mag. 4, No. 3; Sep. 1968; pp. 515-519.

Primary Examiner—Carl E. Hall
Attorney, Agent, or Firm—Antonelli, Terry, Stout & Kraus

[57] ABSTRACT

A method of fabricating a thin film magnetic head including a bottom magnetic core formed on a substrate, a top magnetic core laminated through an insulation layer, with one end of the top and bottom magnetic cores being joined and another end forming a magnetic gap, and a conductor coil layer which winds around the joined section for a plurality of number of turns. At least one of the top and bottom magnetic cores has its magnetization easy axis oriented substantially orthogonal to the magnetic path direction of the magnetic head by the magnetic annealing process, so that the magnetic head has an increased output and an enhanced write ability.

11 Claims, 7 Drawing Sheets

THIN FILM MAGNETIC HEAD AND THE METHOD OF FABRICATING THE SAME

BACKGROUND OF THE INVENTION

This invention relates to a thin film magnetic head having an outstanding read ability used for magnetic recording apparatuses such as magnetic disk units and video tape recorders, and to a method of fabricating the thin film magnetic head.

FIG. 1 shows in brief the structure of a conventional thin film magnetic head. The thin film magnetic head is formed of a pair of magnetic cores 1 and 2, a gap forming layer ($Al_2O_3$) 3, an insulation layer 4, and a coil 6. In the figure, indicated by 7 is an $Al_2O_3$ base film, 8 is a ceramic plate, and 9 is a protection film. For a write operation, a recording current is introduced to the coil 6 so that the magnetic cores 1 and 2 are magnetized, and a signal is recorded on a recording medium (not shown) by the magnetic field which leaks from a gap 10. For a read operation, a magnetic field coming out of the recording medium and passing through the magnetic cores 1 and 2 is detected as a voltage. This magnetic head has read and write abilities using the same magnetic cores 1 and 2. For the magnetic cores, a soft magnetic material with uniaxial anisotropy is generally used because of its high permeability in the high frequency region. In this case, the hard axis of magnetization is oriented to the magnetic path of the magnetic head so that the easy axis of magnetization is substantially orthogonal to the magnetic path. The magnetic core material used currently is a NiFe alloy (Permalloy) with a saturation magnetic flux density of 10,000 G.

In order to increase recording densities of magnetic disk units and the like, it is indispensable to use media with high coercive forces and therefore materials with higher saturation magnetic flux density than Permalloy need to be used for magnetic cores. To meet this requirement, there have been examined amorphous alloys with a saturation magnetic flux density of about 13,000 G, such as CoZrTa, CoHfTa, CoHfTaPd, etc., and crystalline alloys with a saturation magnetic flux density of about 13,000-19,000 G, such as NiFe, CoNiFePd, CoFe, etc., for the magnetic core material.

However, these materials with high saturation magnetic flux density have a large magnetic anisotropy field because of their strong inherent uniaxial anisotropy. The permeability $\mu$ is represented in terms of the saturation magnetic flux density Bs and magnetic anisotropy field Hk as $\mu = Bs/Hk$, and accordingly a large magnetic anisotropy field means a very low permeability. In order to reduce the magnetic anisotropy field through the relaxation of magnetic anisotropy, there has been proposed a method of applying a magnetic field along the magnetization hard axis following the formation of the film, or a method of annealing with the application of a rotating magnetic field, as disclosed in Japanese Patent Publication No. 59-35431, for example. Proposed for the annealing process are ① a method of magnetic field application along the magnetization hard axis immediately after the formation of the magnetic layer; ② a method of rotating magnetic field application after the formation of the magnetic layer; ③ a method of annealing without a magnetic field or with a magnetic field applied along the easy axis after the formation of the magnetic layer, and magnetic field application along the magnetization hard axis after the magnetic anisotropy has settled to some extent; and ④ a method of rotating magnetic field application after annealing without a magnetic field or with a magnetic field application along the easy axis after the formation of the magnetic layer.

The pre-annealing along the magnetization easy axis in the method of item ③ is to control the amount of variation of the magnetic anisotropy field during annealing with the application of a magnetic field in the direction of the magnetization hard axis thereby to prevent the rotation of the magnetic anisotropy field so that the direction of the magnetization hard axis is maintained in the magnetic path direction of the magnetic head. The annealing process in the direction of the magnetization easy axis in the method of item ④ is to control the process so that the magnetic anisotropy field does not become too small by annealing in the rotating magnetic field.

Concerning the annealing temperature during the process in the magnetic field, the annealing temperature for reducing a magnetic anisotropy field for the bottom magnetic layer is set higher than the temperature which is experienced in the subsequent processes.

It has been revealed, however, that although thin film magnetic heads fabricated by this method are satisfactory in their write ability, their read ability is inferior as compared with Permalloy. According to the examination conducted by the inventors of the present invention, the magnetic head fabricated by the abovementioned method has the permeability of its magnetic core lowered significantly after the head has been completed as compared with the state immediately after the annealing process. This fact is supposed to be the cause of the unsatisfactory read ability. The reduction of the permeability is possibly caused by the increase of the magnetic anisotropy field, which has been reduced by annealing at the film formation, in the process of terminal attachment after the formation of a film between layers. The change in the magnetic anisotropy field caused by annealing was examined. FIG. 2 shows the change in the magnetic anisotropy field Hk of a CoHfTa film between temperatures 250° C. and 200° C. After the film has been subjected to annealing at 250° C. for 2 hours with the application of a magnetic field along the magnetization easy axis, the film is subjected to the anisotropy reduction process at 200° C. with the application of a magnetic field along the magnetization hard axis, and then the magnetic anisotropy field falls to 7 Oe in 28 hours. However, when the film is annealed again with the application of a magnetic field along the magnetization easy axis, the magnetic anisotropy field rises to 13 Oe in one hour.

The actual head fabricating process includes a number of annealing processes in the absence of a magnetic field, and these processes produce results identical to the case of magnetic field application in the direction of a magnetization easy axis. Namely, it was revealed that the magnetic anisotropy field which has been reduced by the magnetic annealing process increases again during the easy axis annealing of the subsequent head forming process.

A conceivable manner for retaining a small magnetic anisotropy field of a completed magnetic head is to anneal the head during the fabrication process or on completion of fabrication. FIG. 3 shows in brief the profile of temperature in the thin film magnetic head formation process. In the figure, indicated by ⓐ to ⓔ are positions where annealing of the magnetic core is possible. The figure reveals that in the case of annealing at any position from (a) to (d), the magnetic anisotropy field increases again during such a process as terminal attachment. A conceivable step is the simultaneous annealing for the top and bottom magnetic cores at position (e). However, the bottom magnetic core is subjected to annealing for a longer time than the top magnetic core, and therefore it is not possible to provide the same thermal aging for the top and bottom magnetic cores. For this reason, the top and bottom magnetic cores cannot have their magnetic anisotropy field reduced by the same degree. Accordingly, thin film magnetic heads cannot be formed by the conventional technique which simply reduces the magnetic anisotropy field to achieve a quasi-stability.

The foregoing conventional technique involves the problem of degraded read ability of the magnetic head due to the virtual subsidence of the process for increasing the permeability (reduction of the magnetic anisotropy field).

It is an object of this invention to overcome the foregoing prior art deficiencies and to provide a thin film magnetic head having outstanding read and write characteristics and a method of fabricating the head.

In order to achieve the above problem, the inventive thin film magnetic head comprises top and bottom magnetic cores laminated through an insulation layer on a substrate, with both cores having one end in contact with each other and another end forming a magnetic gap, and a conductor layer which winds around the contact area of the top and bottom magnetic cores, wherein at least one of the top and bottom magnetic cores (preferably the top magnetic core) is formed to have its magnetization easy axis virtually orthogonal to the magnetic path direction of the magnetic head, with the direction of the magnetization easy axis being rotated by the magnetic anisotropy field reduction process.

The inventive thin film magnetic head comprises top and bottom magnetic cores laminated through an insulation layer on a substrate, with both cores having one end joining to each other and another end forming a magnetic gap, and a conductor layer which winds around the junction of the top and bottom magnetic cores for a plurality of number of turns, wherein at least one of the top and bottom magnetic cores (preferably the bottom magnetic core) is formed of an amorphous material including cobalt in an amount of 80 atom-% or more (e.g., amorphous alloys CoZrTa, CoHfTa, CoHfTaPd, etc., with a saturation magnetic flux density of about 13,000 G), or a crystalline material including cobalt in an amount of 20 atom-% or more (e.g., NiFe, CoN:FePd, CoFe, etc. with a saturation magnetic flux density of about 13,000-19,000 G), with its magnetization easy axis being oriented to be orthogonal to the magnetic path of the magnetic head and with its magnetization easy axis direction being rotated by 90° using the magnetic annealing process.

The inventive method of fabricating a thin film magnetic head is such that a bottom magnetic layer is formed on a substrate, an insulation layer is formed on the bottom magnitude layer, and a top magnetic layer is formed on the insulation layer, with one end of both magnetic layers joining to each other and another end forming a magnetic gap, and the top and bottom magnetic layers are formed into patterns to form the top and bottom magnetic cores, wherein at least one of the top and bottom magnetic cores is formed with its magnetization easy axis being substantially parallel to the magnetic path direction of the magnetic head, and thereafter its magnetization easy axis is rotated by 90° using a magnetic annealing process so that the magnetization easy axis is orthogonal to the magnetic path direction of the magnetic head, and thereafter it is formed into a magnetic core pattern.

The inventive method of fabricating a thin film magnetic head is such that a bottom magnetic layer is formed on a substrate, an insulation layer is formed on the bottom magnetic layer, and a top magnetic layer is formed on the insulation layer, with one end of both magnetic layers joining to each other and another end forming a magnetic gap, and the top and bottom magnetic layers are formed into patterns to form the top and bottom magnetic cores, wherein at least one of the top and bottom magnetic cores is formed with its magnetization easy axis being parallel to the magnetic path direction of the magnetic head, and thereafter it is annealed with the application of a magnetic field along the magnetization easy axis, and next the magnetization easy axis is rotated by 90° using the magnetic annealing process so that the easy axis is substantially orthogonal to the magnetic path direction of the magnetic head, and thereafter it is formed into a magnetic core pattern. The magnetic annealing process is preferably one of annealing with the application of a rotating ellipsoidal magnetic field, annealing with the application of orthogonal magnetic fields, and annealing with the application of a magnetic field which is substantially orthogonal to the magnetization easy axis. The annealing with the application of a magnetic field along the magnetization easy axis may be replaced with annealing without the application of magnetic field in the direction of the magnetization easy axis.

The inventive method of fabricating a thin film magnetic head comprises a processing step in which a bottom magnetic layer is formed on a substrate, with its magnetization easy axis being oriented along the magnetic path direction of the magnetic head, the magnetization easy axis is rotated by 90° using the magnetic annealing process so that the easy axis is orthogonal to the magnetic path direction of the magnetic head, and thereafter it is formed into a pattern of a bottom magnetic core, and a processing step in which an top magnetic layer is formed on the bottom magnetic layer through an insulation layer, with one end of both magnetic layers being in contact with each other and with another end forming a magnetic gap, and with its magnetization easy axis being oriented to the magnetic path direction of the magnetic head, the magnetization easy axis of the top magnetic layer is rotated by 90° using the magnetic annealing process so that the easy axis is orthogonal to the magnetic path direction of the magnetic head, and thereafter it is formed into a pattern of a top magnetic core.

The problems of the conventional technique is attributed to the difference in the direction of change in the magnetic anisotropy field between the state of anisotropy relaxation and the final state. The most conceivable method of making these trends consistent is the application of a magnetic field along the magnetic path direction of the magnetic head during the whole process except for the formation of the magnetic layers. However, in order to bring the magnetic cores to complete saturation, it is necessary to apply an external magnetic field stronger than the saturation magnetic flux density, and it will be impractical to install a magnetic field application facility which meets this requirement and also to have industrial production output. Moreover, such a magnetic head creates an extreme increase in the magnetic anisotropy field in response to a temperature rise within the range of normal use.

The inventors of this invention have paid attention to the fact that the change in the magnetic anisotropy field is sharp at the beginning and it becomes moderate later, and have found an annealing method which imposes little change in the magnetic anisotropy field in the absence of a magnetic field. This is based on the result of experiment as described below.

FIG. 4 shows the change in the magnetic anisotropy field when a CoHfTa amorphous film is formed and thereafter annealed at 200° C. with the application of a magnetic field along the magnetization hard axis. In the figure, indicated by 12 is the result of annealing in a magnetic field at 250° C. for one hour, and 11 is the result without annealing. The direction of magnetization easy axis rotates by 90° due to annealing, and the magnetic anisotropy field of this case is shown using the negative sign. In the case of 11, the magnetization easy axis is rotated and the magnetic anisotropy field rises beyond 10 Oe by annealing for one hour, and the rate of change in the magnetic anisotropy field falls below 0.3 Oe/h at a point of 5-hour annealing. On the other hand, in the case of 12, the magnetization easy axis is rotated by 90° using the magnetic annealing of one hour and the magnetic anisotropy field is as small as 3 Oe, and the rate of change in the magnetic anisotropy field falls below 0.7 Oe/h. When attention is paid to the fact that the film is annealed with the application of a magnetic field along the magnetization easy axis for a portion of a negative magnetic anisotropy field and that the rate of change of the magnetic anisotropy field is small in this portion, it is concluded that, since the annealing with the application of a magnetic field along the magnetization easy axis is comparable to the annealing in the absence of magnetic field, there can be a stable state with a small magnetic anisotropy field even in the absence of the external magnetic field.

DESCRIPTION OF THE PREFERRED EMBODIMENTS

Figure 4:
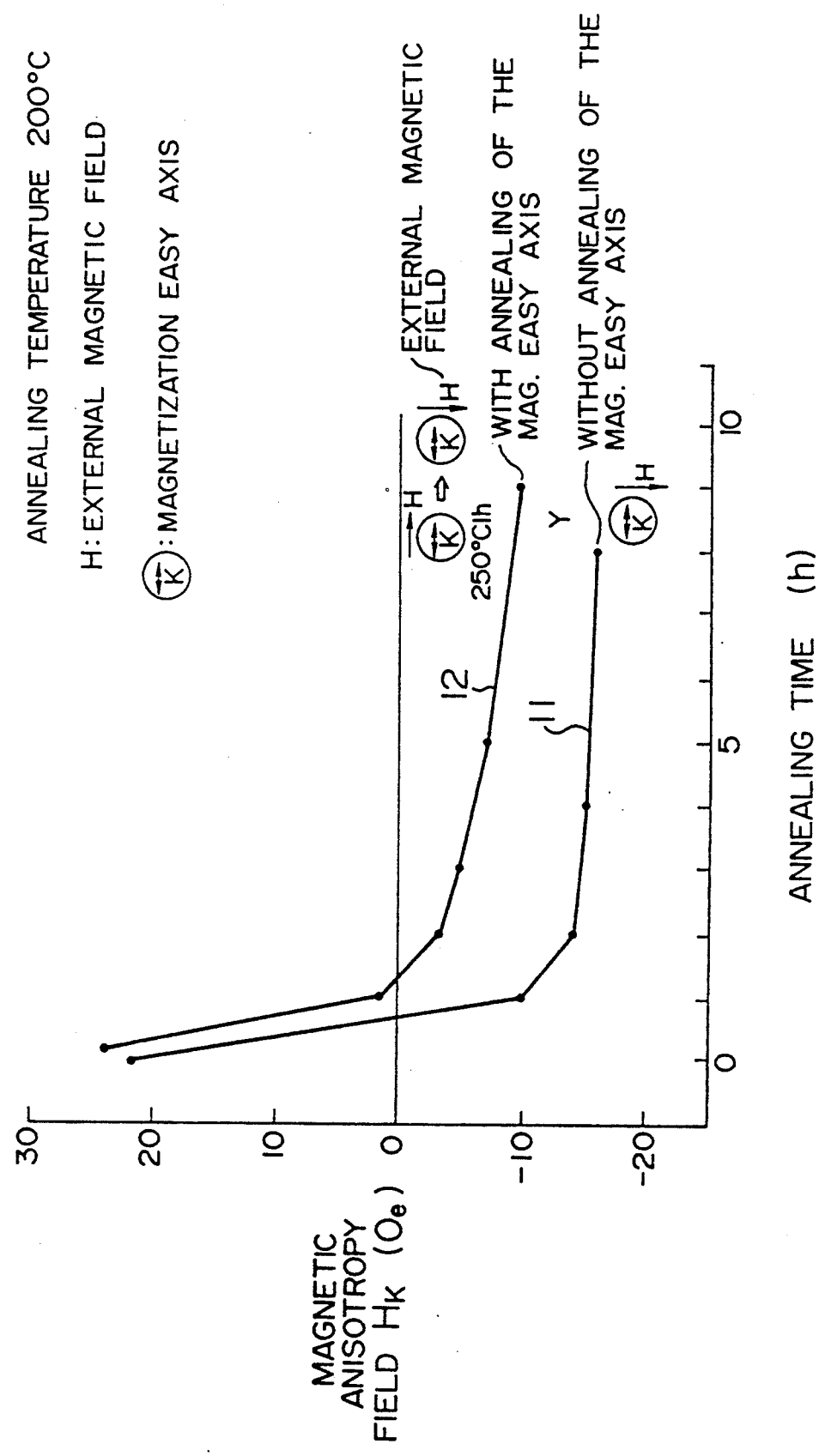
FIG. 4 is a graph showing the rotation by 90° in the magnetization easy axis during annealing in an external magnetic field.
Figure 5:
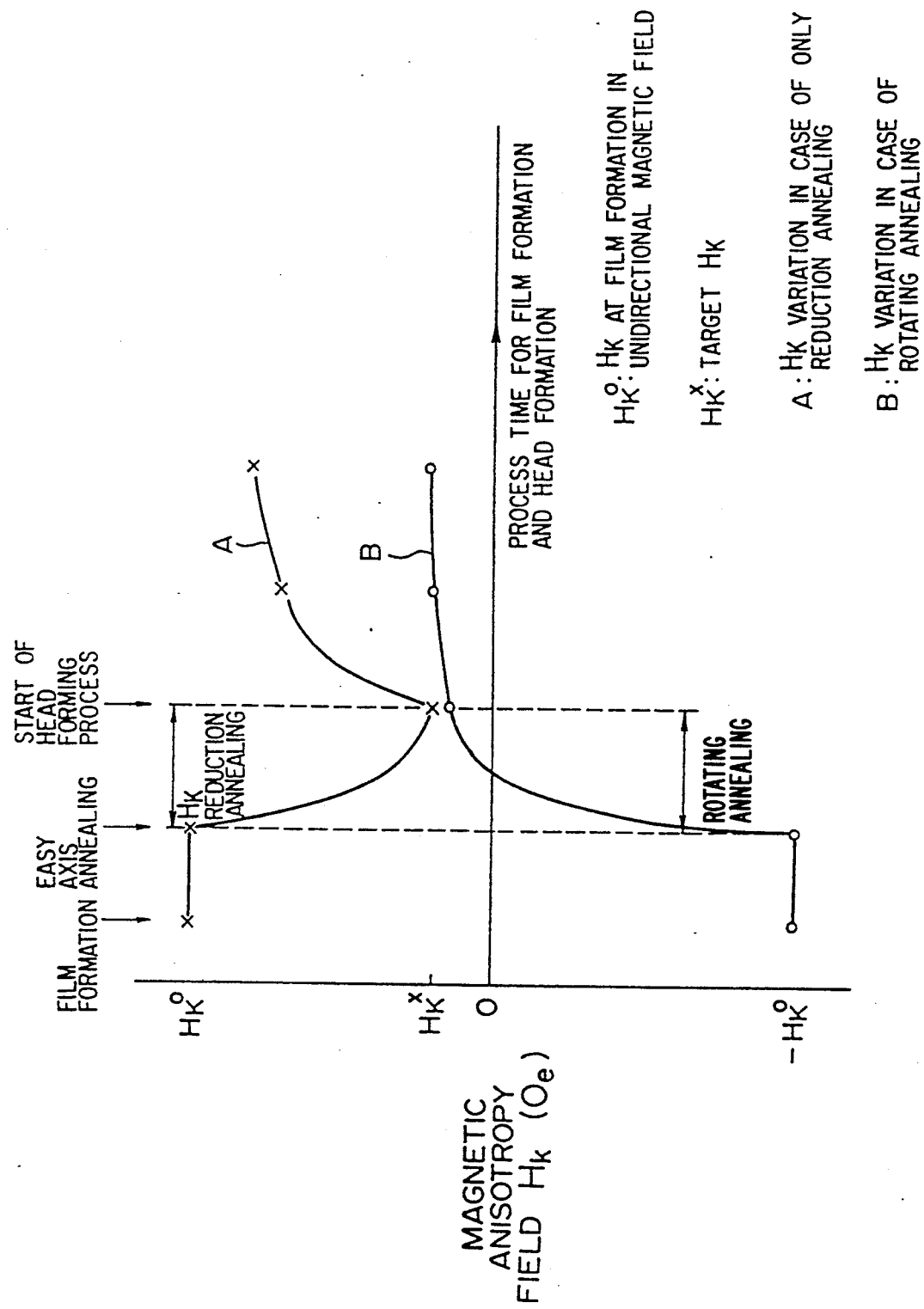
FIG. 5 is a graph showing the rotation by 90° in the magnetization easy axis during annealing in a magnetic field according to this invention.
Figure 6:
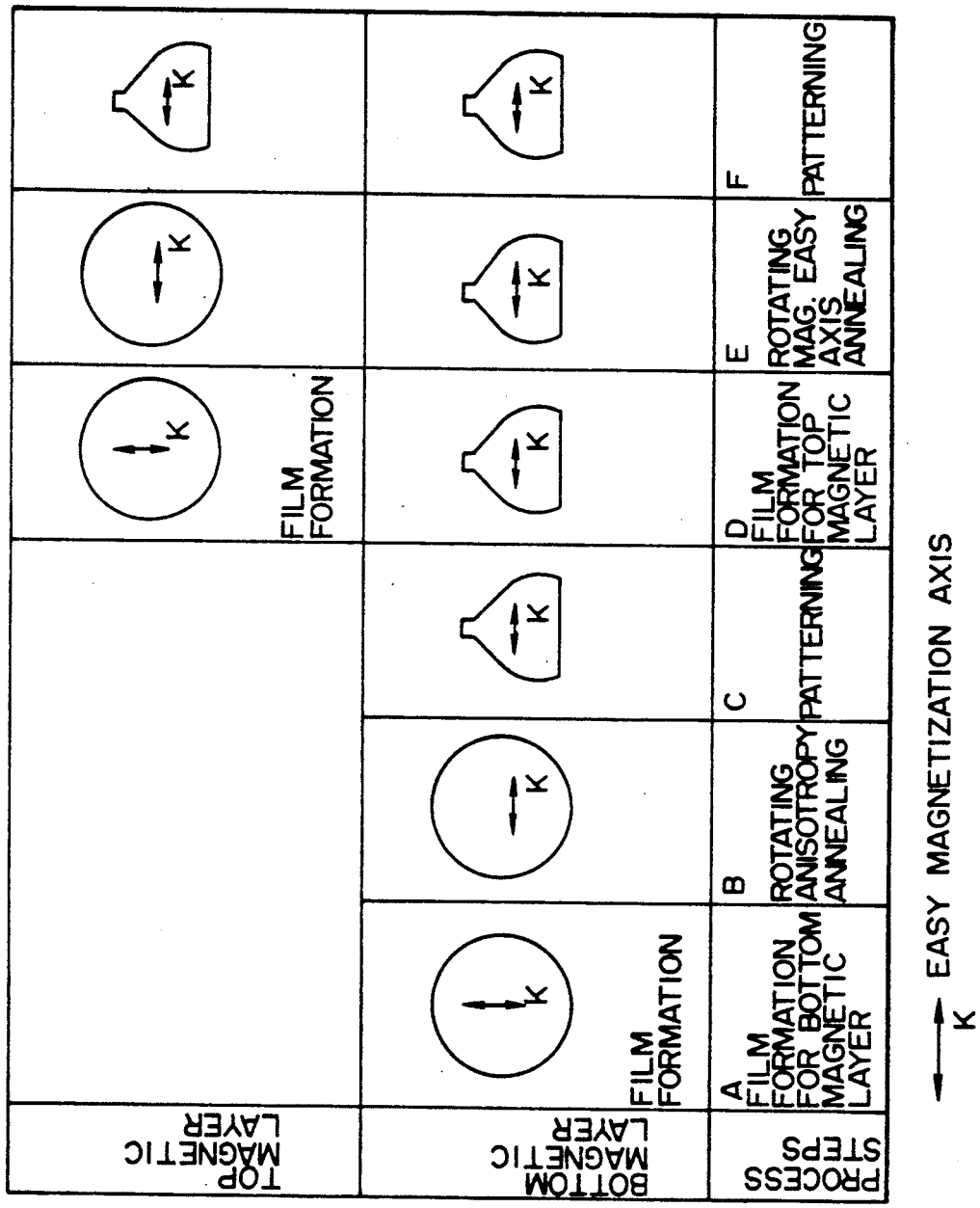
FIG. 6 is a table showing the steps of an annealing process according to this invention.

Embodiments of this invention will be described in detail with reference to FIG. 5 to FIG. 7. FIG. 5 shows the change in the magnetic anisotropy field resulting from a pre-annealing in the direction of the easy axis, the subsequent application of a magnetic field along the magnetization hard axis, and the application of a magnetic field along the magnetization easy axis in compliance with the head forming process. In the figure, indicated by A is the result of annealing without changing the direction of the magnetization easy axis, while indicated by B is the result of annealing until the magnetization easy axis is rotated by 90°. With the intention of matching the direction of anisotropy after magnetic rotation with A, the magnetic anisotropy field before the annealing is shown with the negative sign. By choosing the annealing time along the easy axis, it is possible to provide the same magnitude of the magnetic anisotropy field for A and B at the beginning of the head fabricating process. The comparison with the change in the magnetic anisotropy field, with a magnetic field being applied along the magnetization easy axis, reveals that the curve A rises sharper than the result of FIG. 2, whereas the curve B rises less sharply than the result of FIG. 4. Accordingly, it is conceivable that by making the magnetization easy axis of the magnetic core to be orthogonal to the magnetic path in the region of a small change of the magnetic anisotrpy field represented by B, i.e., by orienting the magnetization easy axis to the magnetic path direction of the magnetic head by the application of an external magnetic field at the formation of the film and thereafter by rotating the magnetization easy axis in the direction perpendicular to the magnetic path direction of the magnetic head, a sharp increase in the magnetic anisotropy field during the process can be prevented.

The following describes the head fabrication process based on this method. In step A in FIG. 6, the bottom magnetic layer is formed, with its magnetization easy axis K being oriented to the magnetic path direction, and thereafter in step B, annealing is conducted with the application of ① a unidirectional magnetic field along the hard axis, ② a rotating ellipsoidal magnetic field having a highest magnetic field strength along the hard axis, or ③ long-term, orthogonal, alternate magnetic fields, so that the magnetization easy axis K is rotated by about 90°. The annealing temperature needs to be higher than the temperature in forming the inter-layer insulation layer, because although the magnetic anisotropy field is stabilized after the rotation the magnetization easy axis, the rate of change will increase when it is exposed to a higher temperature. In this case, a pre-annealing may be conducted along the easy axis. The annealing temperature in the process step B is 300°–400° C. or above in the case of using polyimid resin or the like for the inter-layer material, or 200°–300° C. or above in the case of using photo-resist or the like, or a temperature higher than the annealing temperature for the top magnetic layer or the temperature experienced during the formation of the insulation layer. After the top magnetic layer has been formed, with its magnetization easy axis K being oriented to the magnetic path direction, annealing is conducted in the process step E at or below the withstand temperature of the inter-layer insulation layer with the application of a magnetic field in any of the above-mentioned manners ① through ③. Consequently, the annealing temperature for the top magnetic layer becomes lower than that for the bottom magnetic layer. However, the annealing temperature in this process needs to be higher than the maximum temperature in the subsequent processes such as the attachment of terminals. In the case of conducting the annealing for the rotation of the magnetization easy axis of the top magnetic layer, the magnetization easy axis of the bottom core does not rotate when the annealing is conducted in the absence of a magnetic field. Since the foregoing annealing process is not based on the method of magnetic layer fabrication, therefore it achieves similar effectiveness for magnetic pores which are formed by the plating method, evaporation method, and the like. The pattern formation in the process step C in FIG. 6 signifies the formation of several hundred work pieces in the shape of a magnetic head, as shown in process step C, from a piece of magnetic material shown as a disc in the process steps A and B, for example. The shape of the magnetic head is a planar shape of the magnetic head including the portion shown by the dashed line D in FIG. 1.

A method of fabricating a magnetic head which is intended to reduce the change due to aging by rotating the magnetization easy axis by 90° after the pattern formation of the magnetic film, is disclosed in Japanese Patent Unexamined Publication No. 63-809. However, in this technique, ① heating during the process such as the formation of the inter-layer insulation layer is not considered, and therefore the magnetic anisotropy field after the completion of the head cannot be made smaller; ② since annealing is conducted after pattern formation in the shape of the magnetic head, a magnetic field strength which is at least as high as the saturation magnetic flux density is required in order to saturate the end part of the pattern; ③ since annealing is conducted for the intricate head shape, the magnetic anisotropy deviates from the specified direction after the rotation of the magnetic anisotropy field; and particularly for an amorphous material, direct application of a magnetic field along the hard axis after the formation of the film causes the magnetic anisotropy field to increase in the direction after the rotation of the magnetization easy axis, resulting in a lowered permeability.

Figure 2:
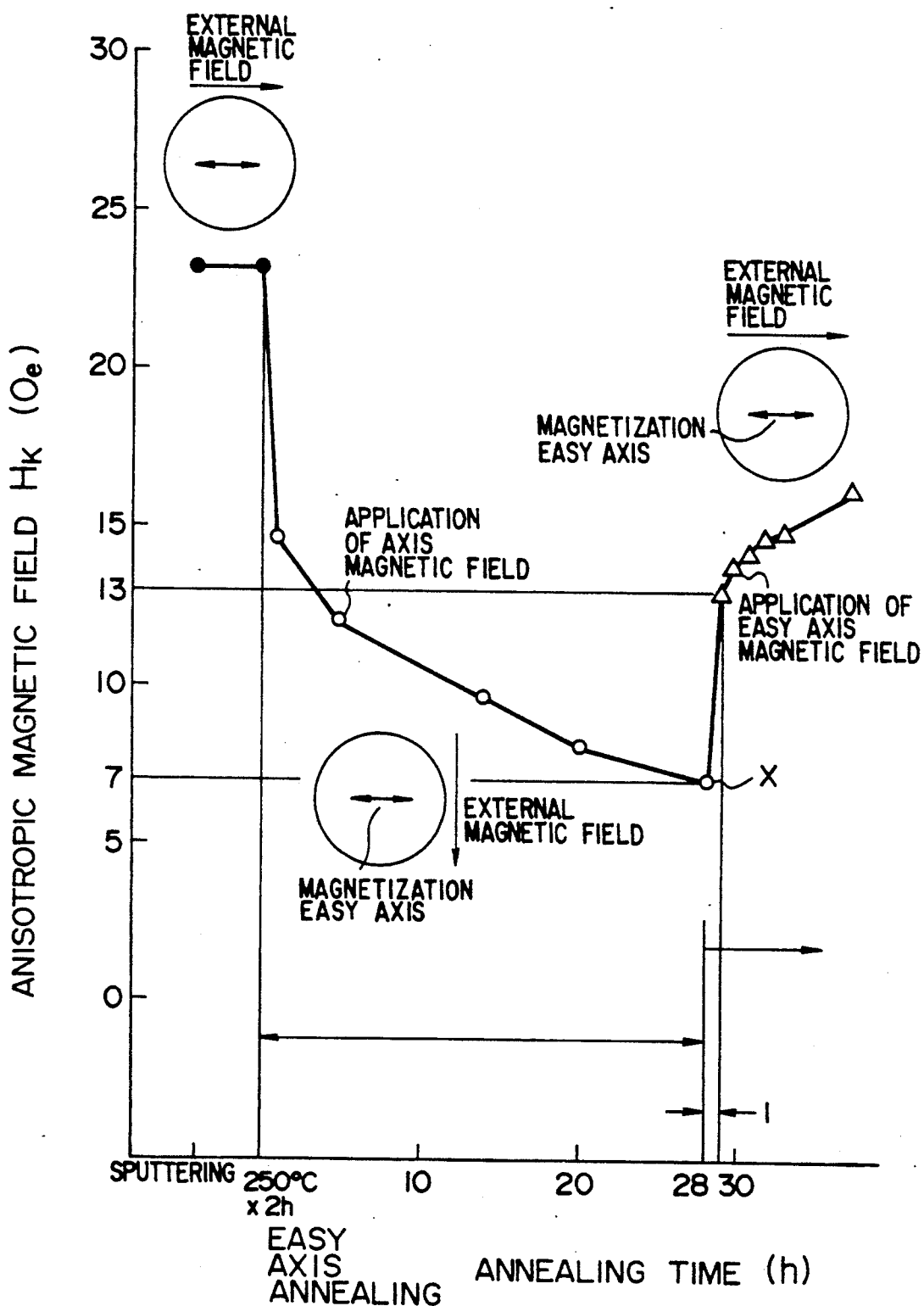
FIG. 2 is a graph showing the change in the magnetic anisotropy field during the annealing of a CoHfTa film.
Figure 3:
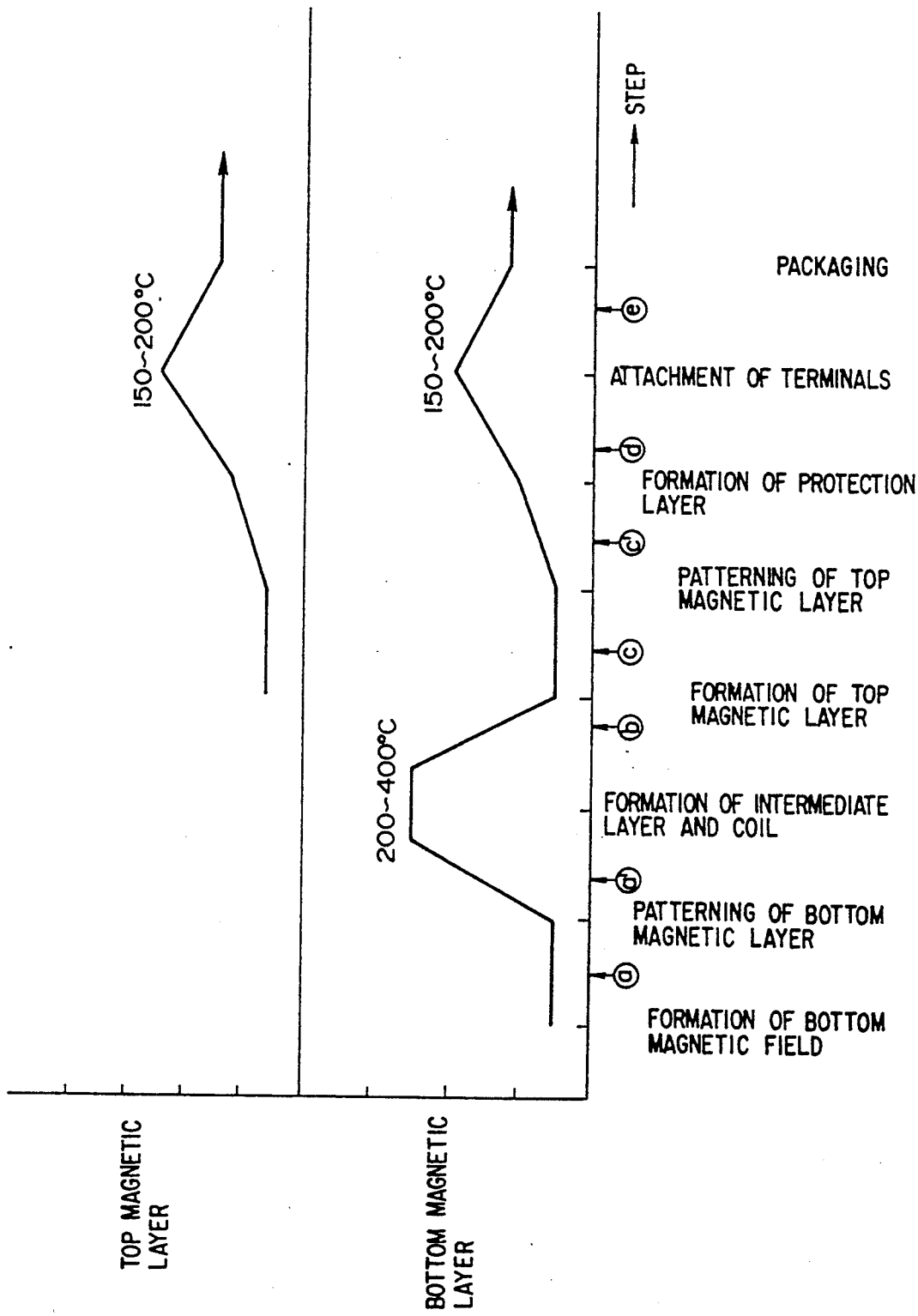
FIG. 3 is a graph showing in brief the process of fabricating the conventional thin film magnetic head.

The following describes the reason for the thermal stabilization of the magnetic anisotropy field accomplished by this invention. The origin of uniaxial magnetic anisotropy has been studied for Permalloy as described in the publication IEEE TRANSACTIONS ON MAG. Vol. MAG-4, No. 3, pp. 515-519, published in Sept. 1968, for example. This paper says that there are magnetic distortion constraints, lattice defects (air holes, inter-lattice atoms, etc.), regular directional arrangement of Fe atoms and defects. Although all anisotropies attributed by these causes decrease by annealing in the direction of the hard axis, their rates of change differ due to different activitation energies in the process. A phase of small activation energy ends quickly, and a phase of large activation energy progresses slowly. On this account, the change in the magnetic anisotropy field during the annealing along the hard axis includes a sharp section and a moderate section. A Co-based amorphous material also exhibits a sharp section and a moderate section similar to Permalloy in the change of the magnetic anisotropy field, and therefore there are at least two phases with small activation energy and large activation energy. In FIG. 2, when the application of the external magnetic field is suspended or switched in its application direction by 90°, with the magnetic anisotropy field K of the film being different from the magnetic field application direction, (point X), the direction of the change in the magnetic anisotropy field varies by 90°, and therefore the phase of small activation energy progresses sharply, this time in the direction of increase of anisotropy, and subsequently the phase of large activation energy progresses slowly and the magnetic anisotropy field increases. However, because of a large rate of change in the magnetic anisotropy field in the phase of small activation energy, the magnetic anisotropy field quickly approaches the value before the annealing. On the other hand, even if the application of the external magnetic field is suspended when the magnetic anisotropy field K of the film is coincident with the magnetic field application direction (point Y), the direction of magnetic anisotropy field does not vary, and therefore the increase in the magnetic anisotropy field is small. Namely, as a result of a consistent direction of change in magnetic anisotropy between the state of annealing in the absence of a magnetic field during the process and the state before the annealing, the magnetic anisotropy field is stabilized.

EMBODIMENT 1

Figure 1:
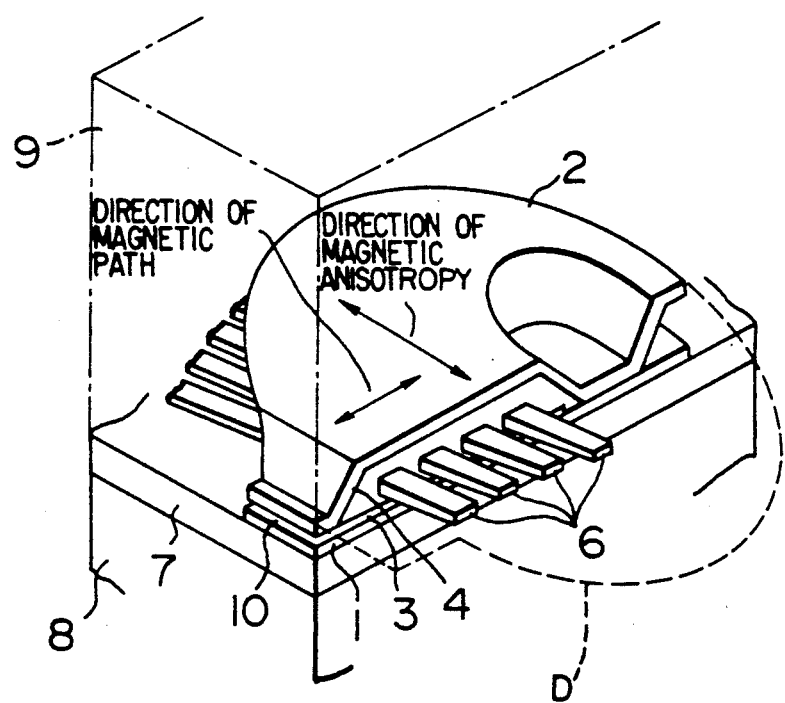
FIG. 1 is a perspective diagram showing in brief the structure of a conventional thin film magnetic head.

A magnetic head A has a top magnetic layer and a bottom magnetic layer, as shown in FIG. 1, formed of $Co_{93}Hf_4Ta_3$ amorphous films by sputtering, with their magnetic anisotropy being oriented in the direction of a track width and with their magnetic anisotropy field being reduced from 25 Oe to 3 Oe through the annealing process at 350° C. in the rotating magnetic field for one hour after the film formation. The insulation layer is made of polyimid resin. A magnetic head B is formed of the same magnetic layers and insulation layer as the magnetic head A, but with their magnetic anisotropy being oriented along the magnetic path direction and with their magnetic anisotropy field being lowered to 4 Oe through the annealing processes in the easy axis direction at 380° C. and in the hard axis direction at 350° C. for the bottom magnetic layer and through the annealing processes at 300° C. and 280° C., respectively, for the top magnetic layer. Reduction of magnetic anisotropy field is carried out using a rotating ellipsoidal magnetic field of 30 Oe in the hard axis direction and 20 Oe in the easy axis direction and at a frequency of 5 Hz. The resulting output of the magnetic head B is about twice that of A. Based on the magnetic anisotropy field Hk and the saturation magnetic flux density Bs of the magnetic layers measured by the magneto-elastic effect method, the magnetic head A has a Bs/Hk value of 500 and the magnetic head B has a value of 2300. Presumably, the magnetic head A has a decreased output due to the increased magnetic anisotropy field by annealing during the process, although it has its magnetic anisotropy field reduced by the annealing process in the rotating magnetic field. In addition, the magnetic head A can have its head output made comparable to the magnetic head B through a subsequent magnetic anisotropy field reduction process at 200° C. for 10 hours, for example, with the application of an external magnetic field of 10 kOe along the magnetic path direction shown in FIG. 1. However, when the magnetic head A which now has the comparable head output is subjected to another thermal aging at 200° C. for two hours, the magnetic head A which rotates the magnetization easy axis by 90° using the magnetic annealing process has its head output lowered by about 15% relative to the value before the thermal aging, in contrast to the magnetic head B which has virtually no change in the head output before and after the thermal aging.

EMBODIMENT 2

A magnetic head C has a top magnetic layer and a bottom magnetic layer, as shown in FIG. 1, formed of $Co_{92}Zr_3Ta_5$ amorphous films by sputtering, with their magnetic anisotropy being oriented in the direction of a track width and with their magnetic anisotropy field being lowered from 15 Oe to 3 Oe through the annealing process at 200° C. in the rotating magnetic field for one hour after the film formation. The insulation layer is made of photo-resist. A magnetic head D is formed of the same magnetic layers and insulation layer as the magnetic head C, but with their magnetic anisotropy being oriented along the magnetic path direction and with their magnetic anisotropy field being lowered to 3 Oe through the annealing processes in the easy axis direction and in the hard axis direction at 250° C. for the bottom magnetic layer and through the annealing processes at 200° C. and 180° C., respectively, for the top magnetic layer. Reduction of the magnetic anisotropy field is carried out using a unidirectional magnetic field of 30 Oe in the hard axis direction. The output of the magnetic head D is about 2.2 times that the magnetic head C. Based on the magnetic anisotropy field Hk and the saturation magnetic flux density Bs of the magnetic layers measured by the magneto-elastic effect method, the magnetic head, C has a Bs/Hk value of 400 and the magnetic head D has a value of 1800. Presumably, the magnetic head C has a decreased output due to the increased magnetic anisotropy field by annealing during the process, although it has its magnetic anisotropy field lowered by the annealing process in the rotating magnetic field, as in the case of the magnetic head A.

EMBODIMENT 3

A magnetic head E has a top magnetic layer and a bottom magnetic layer, as shown in FIG. 1, formed of $Co_{56}Ni_{38}Fe_6$ of crystalline films by plating, with their magnetic anisotropy being oriented in the direction of a track width, and with their magnetic anisotropy field being lowered from 28 Oe to 4 Oe through the annealing process at 200° C. in the unidirectional magnetic field for one hour immediately after plating. The insulation layer is made of photo-resist. A magnetic head F is formed of the same magnetic layers and insulation layer as the magnetic head D, but with their magnetic anisotropy being oriented along the magnetic path direction and with their magnetic anisotropy field being lowered to 3 0e through the annealing processes in the easy axis direction and in the hard axis direction at 300° C. for the bottom magnetic layer and through the annealing processes at 250° C. and 220° C., respectively, for the top magnetic layer. The output of the magnetic head F is about 1.8 times that of the magnetic head E. Based on the magnetic anisotropy field Hk and the saturation magnetic flux density Bs of the magnetic layers measured by the magneto-elastic effect method, the magnetic head E has a Bs/hk value of 700 and the magnetic head F has a value of 2200.

EMBODIMENT 4

A magnetic head G has a top magnetic layer and a bottom magnetic layer, as shown in FIG. 1, formed of $Co_{25}Ni_{50}Fe_{15}$ crystalline films by sputtering, with their magnetic anisotropy being oriented in the direction of a track width and with their magnetic anisotropy field being reduced through the annealing process in the unidirectional magnetic field along the magnetic path direction after the completion of the magnetic head. A magnetic head H has its magnetic anisotropy being oriented in the direction of a track width and with its magnetic anisotropy field being reduced through the annealing processes in the easy axis direction and in the hard axis direction. The output of the magnetic head H is 1.4 times that of the magnetic head G.

Figure 7:
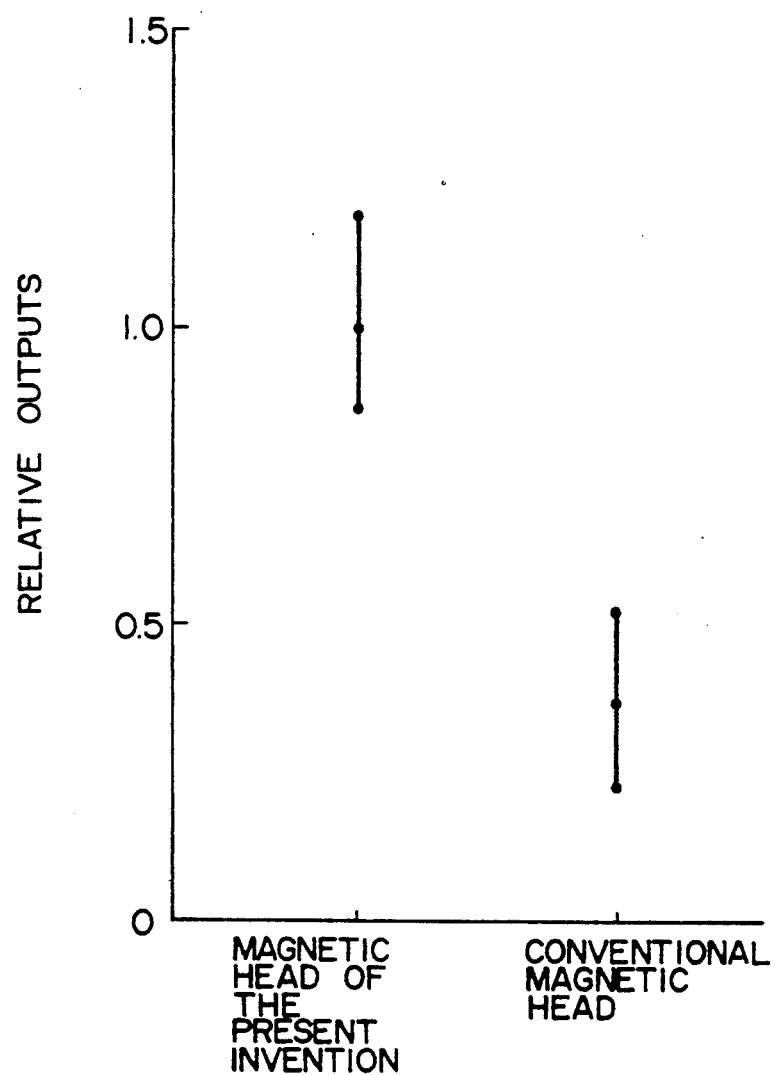
FIG. 7 is a graph comparing the relative outputs of the thin film magnetic head fabricated by the inventive method and that fabricated by the conventional method.

FIG. 7 shows relative values of outputs produced by a number of magnetic heads of the same shape based on the conventional fabricating method and annealed by the inventive method. The figure reveals that the inventive fabricating method provides magnetic heads having a output approximately twice that of magnetic heads based on the conventional method.

According to this invention, the output of the thin film magnetic head can be raised and its write ability can be enhanced. According to the inventive method, the foregoing thin film magnetic heads can readily be fabricated.

We claim:

1. A method of fabricating a thin film magnetic head comprising the steps of:
   (a) forming a bottom magnetic cord on a substrate while applying an external magnetic field therein in a direction substantially parallel to a magnetic path direction of the magnetic head to orient a magnetization easy axis of the bottom magnetic core such that the magnetization easy axis extend substantially parallel to the magnetic path direction;
   (b) heat-treating the bottom magnetic core while applying an external magnetic field thereto in a direction substantially perpendicular to the magnetic path direction to rotate the magnetization easy axis of the bottom magnetic core such that the magnetization easy axis extends substantially perpendicular to the magnetic path direction;
   (c) forming a magnetic gap forming layer on the bottom magnetic core; and
   (d) forming a top magnetic core on the magnetic gap forming layer and the bottom magnetic core such that one end of the top magnetic core is separated from one end of the bottom magnetic core by the magnetic gap forming layer and another end of the top magnetic core is in contact with another end of the bottom magnetic core, thereby forming a magnetic path extending in the magnetic path direction.

2. A method according to claim 1, wherein the external magnetic field applied in the heat-treating step (b) is one of (1) a unidirectional magnetic field and (2) an ellipsoidal magnetic field having a higher magnetic strength in a direction substantially perpendicular to the magnetic path direction.

3. A method according to claim 1, wherein the heat-treating step (b) is performed at a temperature higher than a temperature at which any succeeding step in fabricating the magnetic head is performed.

4. A method of fabricating a thin film magnetic head comprising the steps of:
   (a) forming a bottom magnetic core on a substrate while applying an external magnetic field thereto in a direction substantially parallel to a magnetic path direction of the magnetic head to orient a magnetization easy axis of the bottom magnetic core such that the magnetization easy axis extends substantially parallel to the magnetic path direction;
   (b) heat-treating the bottom magnetic core while applying an external magnetic field thereto in a direction substantially parallel to the magnetic path direction;
   (c) heat-treating the bottom magnetic core while applying an external magnetic field thereto in a direction substantially perpendicular to the magnetic path direction to rotate the magnetization easy axis of the bottom magnetic core such that the magnetization easy axis extends substantially perpendicular to the magnetic path direction;

(d) forming a magnetic gap forming layer on the bottom magnetic core; and (e) forming a top magnetic core on the magnetic gap forming layer and the bottom magnetic core such that one end of the top magnetic core is separated from one end of the bottom magnetic core by the magnetic gap forming layer and another end of the top magnetic core is in contact with another end of the bottom magnetic core, thereby forming a magnetic path extending in the magnetic path direction.

5. A method according to claim 4, wherein the external magnetic field applied in the heat-treating step (c) is one of (1) a unidirectional magnetic field and (2) an ellipsoidal magnetic field having a highest magnetic strength in a direction substantially perpendicular to the magnetic path direction.

6. A method according to claim 4, wherein the heat-treating step (c) is performed at a temperature higher than a temperature at which any succeeding step in fabricating the magnetic head is performed.

7. The method of fabricating a thin film magnetic head comprising the steps of:

(a) forming a bottom magnetic core on a substrate while applying an external magnetic field thereto in a direction substantially parallel to a magnetic path direction of the magnetic head to orient a magnetization easy axis of the bottom magnetic core such that the magnetization easy axis extends substantially parallel to the magnetic path direction;

(b) heat-treating the bottom magnetic core without applying an external magnetic field thereto;

(c) heat-treating the bottom magnetic core while applying an external magnetic field thereto in a direction substantially perpendicular to the magnetic path direction to rotate the magnetization easy axis of the bottom magnetic core such that the magnetization easy axis extends substantially perpendicular to the magnetic path direction;

(d) forming a magnetic gap forming layer on the bottom magnetic core; and (e) forming a to magnetic core on the magnetic gap forming layer and the bottom magnetic core such that one end of the top magnetic core is separated from one end of the bottom magnetic core by the magnetic gap forming layer and another end of the top magnetic core is in contact with another end of the bottom magnetic core, thereby forming a magnetic path extending in the magnetic path direction.

8. A method according to claim 7, wherein the external magnetic field applied in the heat-treating step (c) is one of (1) a unidirectional magnetic field and (2) an ellipsoidal magnetic field having a highest magnetic strength in a direction substantially perpendicular to the magnetic path direction.

9. A method according to claim 7, wherein the heat-treating step (c) is performed at a temperature higher than a temperature at which any succeeding step in fabricating the magnetic head is performed.

10. A method of fabricating a thin film magnetic head comprising the steps of:

(a) forming a bottom magnetic core on a substrate;

(b) forming a magnetic gap forming layer on the bottom magnetic core;

(c) forming a top magnetic core on the magnetic gap forming layer and the bottom magnetic core while applying an external magnetic field thereto in a direction substantially parallel to a magnetic path direction of the magnetic head to orient a magnetization easy axis of the top magnetic core such that the magnetization easy axis extends substantially parallel to the magnetic path direction, the top magnetic core being formed on the magnetic gap forming layer and the bottom magnetic core such that one end of the top magnetic core is separated from one end of the bottom magnetic core by the magnetic gap forming layer and another end of the top magnetic core is in contact with another end of the bottom magnetic core, thereby forming the magnetic path extending in a magnetic path direction; and (d) heat-treating the top magnetic core while applying an external magnetic field thereto in a direction substantially perpendicular to the magnetic path direction to rotate the magnetization easy axis of the top magnetic core such that the magnetization easy axis extends substantially perpendicular to the magnetic path direction.

11. A method of fabricating a thin film magnetic head comprising the steps of:

(a) forming a bottom magnetic core on a substrate while applying an external magnetic field thereto in a direction substantially parallel to a magnetic path direction of the magnetic head to orient a magnetization easy axis of the bottom magnetic core such that the magnetization easy axis extends substantially parallel to the magnetic path direction;

(b) heat-treating the bottom magnetic core while applying an external magnetic field thereto in a direction substantially parallel to the magnetic path direction;

(c) heat-treating the bottom magnetic core while applying an external magnetic field thereto in a direction substantially perpendicular to the magnetic path direction to rotate the magnetization easy axis of the bottom magnetic core such that the magnetization easy axis extends substantially perpendicular to the magnetic path direction;

(d) forming a magnetic gap forming layer on the bottom magnetic core;

(e) forming a top magnetic core on the magnetic gap forming layer and the bottom angetic core while applying an external magnetic field thereto in a direction substantially parallel to the magnetic path direction to orient a magnetization easy axis of the top magenta are such that the magnetization easy axis extends substantially parallel to the magnetic path direction, the top magnetic core being formed on the magnetic gap forming layer and the bottom magnetic core such that one end of the top magnetic core is separated from forming layer and another end of the top magnetic core is in one end of the bottom magnetic core by the magnetic gap contact with another end of the bottom magnetic core, thereby forming a magnetic path extending in the magnetic path direction; and (f) heat-treating the top magnetic core while applying an external magnetic field thereto in a direction substantially perpendicular to the magnetic path direction to rotate the magnetization easy axis of the top magnetic core such that the magnetization easy axis extends substantially perpendicular to the magnetic path direction.

* * * * *